2,767,173
Patented Oct. 16, 1956

2,767,173

BACTERICIDAL AND FUNGICIDAL COMPOUNDS

Leon Katz, Springfield, N. J., assignor to Schenley Industries, Inc., New York, N. Y., a corporation of Delaware No Drawing. Application April 22, 1953,
Serial No. 350,510

6 Claims. (Cl. 260—240)

The present invention relates to new compounds which are derivatives of thiosalicylhydrazide, possessing remarkably high fungicidal and bactericidal activity.

I have found that, whereas the known salicylhydrazide has little or no antifungal activity in vitro against such organisms as *Trichophyton mentagrophytes, Microsporum gypseum,* and *Nocardia asteroides,* its sulfur isologue, thiosalicylhydrazide, surprisingly is remarkably active against these organisms. I also have found that 2,4-dichlorobenzalthiosalicylhydrazide, having the formula

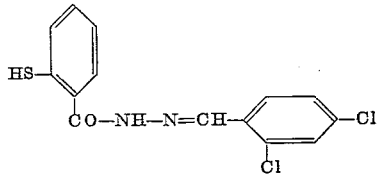

is even more active than thiosalicylhydrazide itself and that thiosalicylhydrazide is readily oxidized to the disulfide (dithiosalicylhydrazide) which itself is even more active than the parent thiol against these organisms. The bactericidal and fungicidal activities of both the thiols and the disulfides are increased and other desirable properties are imparted thereto by the presence of various substituents in the compounds, as more specifically pointed out hereinafter.

By the terms "thiosalicylhydrazide" and "dithiosalicylhydrazide," as used throughout this specification, I refer to, as thiosalicylhydrazide, the compound represented by the formula:

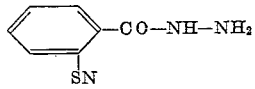

and, as dithiosalicylhydrazide, the compound represented by the formula:

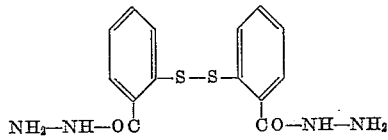

by analogy with such designations as salicylamide and salicylanilide. Related compounds are referred to by similar designations.

The thiol (thiosalicylhydrazide) is also known as thiosalicylic acid hydrazide, thiosalicyloylhydrazine, 1-(orthomercaptobenzoyl)hydrazine and similar designations, while the disulfide (dithiosalicylhydrazide) is also referred to as bis-(benzoic acid hydrazide) ortho disulfide, 2,2'-bis-carbohydrazinodiphenyl disulfide, and similar resignations.

The compounds of the present invention include thiosalicylhydrazides, including thiosalicylhydrazide itself, the 4-chloro, 5-chloro, 4-bromo, 5-bromo, 3,5-dichloro, 3,5-dibromo, the various trichloro and tribromo and tetrachloro thiosalicylhydrazides, the corresponding disulfides (dithiosalicylhydrazides), as well as benzyl and benzal (benzylidene) and hydroxy, halogen, alkoxy and lower-alkylsulfonyl-substituted benzyl and benzal hydrazides of thiosalicylic and the halogen-substituted thiosalicylic acids and the corresponding disulfides of these hydrazides. The new benzal-substituted thiosalicylhydrazides may be represented by the general formula:

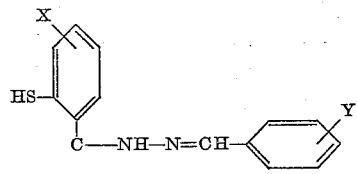

in which X and Y are optional substituents; X may be one or more (maximum of four) halogen substituents of the group consisting of chlorine and bromine and Y may be one or more (maximum of five) substituents of the group consisting of chlorine, bromine, lower-alkyl and lower-alkoxy substituents, including particularly those required to produce the 2,4-dichloro, 3,4-dichloro and 2-methoxy benzal hydrazides of thiosalicylic and substituted dithiosalicylic acids. Included also are the disulfides represented by the general formula

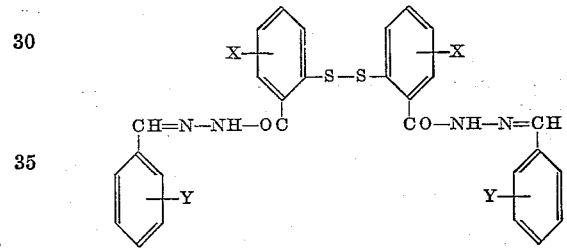

in which X and Y have the significance hereinbefore assigned.

Compounds in which the phenyl portion of the benzal radicals of the foregoing formulae are replaced by quinolyl radicals, such as are formed by the reaction of a formylquinoline (quinolinecarboxaldehydes), particularly 2 and 4-formylquinolines, with thiosalicylhydrazide or dithiosalicylhydrazide, are also characterized by excellent bactericidal and fungicidal properties.

The corresponding benzyl compounds, obtained by reduction of the benzal compounds, are also active bactericides and fungicides.

The compounds of the present invention may be represented by the following skeletal formula:

in which R is an ortho-phenylene radical which may be substituted by one or more chlorine or bromine atoms: W is an amino, benzalimino (benzylidenimino, C₆H₅CH=H—)

or benzylamino radical that may be substituted by one or more hydroxy, chlorine, bromine, lower-alkyl, lower-alkoxy or lower-alkylsulfonyl radicals, or it may be a radical of the formula —N=CH—Q in which Q is a quinolyl radical such as a 2 or 4-quinolyl radical; and Z is a hydrogen atom or a radical identical with the —S—R—CO—NH—W radical.

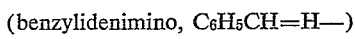

By virtue of the bactericidal and fungicidal activities possessed by the compounds of the present invention, and their comparatively low toxicities to humans, they are especially adapted for use in therapeutic compositions for topical application. They may, however, be used, as are other fungicides, in compositions for the preservation of wood, textiles and other fibres that are subject to mold attack. These compounds are also starting materials for the production of N-benzylidene and N-quinolylmethylene-substituted 2-aminobenzisothiazolones, such as are described and claimed in my copending applications with William Schroeder, Serial No. 478,507 and 478,508, filed December 29, 1954.

*Preparation of thiosalicylic and substituted thiosalicylic acids*

Dithiosalicylic acid, from which thiosalicylic acid may be obtained, can be prepared by known methods.

Thiosalicylic acid can be prepared by the method described in Organic Syntheses, vol. 12 (1932), page 77, which involves a reduction of dithiosalicylic acid with zinc and acetic acid, or preferably with sodium hydrosulfite in alkaline solution. Thiosalicylic acid can also be prepared by diazotization of anthranilic acid with sodium nitrite and condensation of the diazonium solution with potassium ethyl xanthate, followed by hydrolysis. This latter general method is used for the preparation of substituted thiosalicylic acids because substituted anthranilic acids are more readily available or can be more easily prepared than the substituted dithiosalicylic acids. The preparation of 5-chlorothiosalicylic acid

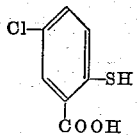

which is a typical method of preparing substituted thiosalicylic acids, may be effected as follows:

A solution of 94 grams (0.545 mole) of 5-chloroanthranilic acid, 23 grams (0.55 mole) of sodium hydroxide and 34.5 grams (0.545 mole) of sodium nitrite in 650 milliliters of water is added slowly and with good agitation to a mixture of 150 milliliters of concentrated hydrochloric acid and 200 grams of ice in a beaker immersed in an ice bath, while the temperature is maintained between 0 and 5° C. After completion of the addition of the solution, the mixture is stirred for 30 minutes and neutralized to Hydrion paper with potassium acetate. The cold diazonium solution is then charged, in a thin stream, into a beaker containing a solution of 250 grams (1.55 moles) of potassium ethyl xanthate in 800 milliliters of water that has been heated to 75–80° C. and is stirred vigorously. The temperature is maintained at 75–80° C. during the addition, which is accompanied by a copious evolution of nitrogen. Some oily material may separate during the reaction. The reaction mixture is cooled, acidified to approximately pH 3 with concentrated hydrochloric acid and the aqueous phase is decanted from the semi-solid sludge that forms. The sludge is dissolved in 400 milliliters of 10% aqueous sodium hydroxide solution and heated on a steam bath for approximately 2 hours. In order to insure that the thiol compound is present, 50 grams of sodium hydrosulfite is added and the solution is maintained at a temperature of 80 to 90° C. for 10 minutes; this addition of reducing agent may be omitted or a smaller amount may be used, dependent upon the particular conditions in different reaction mixtures. The solution is then filtered, cooled, acidified with concentrated hydrochloric acid to a pH between 4 and 5, and the solid collected quickly. The filter cake is then washed with water and is sucked as dry as possible with the aid of a rubber dam.

In the foregoing manner, from appropriate anthranilic acids, the following thiosalicylic acids have been prepared:

| Thiosalicylic Acid | M.P., °C. |
|---|---|
| 1. 4-Chloro- | 195–196 |
| 2. 5-Chloro- | 193–194 |
| 3. 3,5-Dichloro- | 196–198 |
| 4. 5-Bromo- | 210–211 |
| 5. 3,5-Dibromo- | 221–222 |
| 6. 4-Methylsulfonyl- | 180–181 |
| 7. 4-Methoxy- | 240 |

*Preparation of dithiosalicylic acids*

Thiosalicylic acid and its hydrazide and their derivatives oxidize to the corresponding disulfides on exposure to air. However, for purpose of complete conversion and preparation of the corresponding disulfides, the reaction can be hastened with mild oxidizing agents such as halogens, particularly iodine. The preparation of 5,5'-dichlorodithiosalicylic acid, which is a typical procedure, may be conducted as follows:

Three (3) grams of 5-chlorothiosalicylic acid, prepared as described hereinbefore, is dissolved in 50 milliliters of methanol and slightly more than one equivalent (approximately 2.1 grams) of iodine crystals are added thereto. The solution is allowed to stand at room temperature for several minutes and the precipitated 5,5'-dichlorodithiosalicylic acid is separated by filtration. The product has a melting point of 326–328° C., and weighs approximately 2.8 grams. On recrystallization from a mixture of methyl cellosolve, methanol and water, its melting point is increased to 330° C. Its formula is

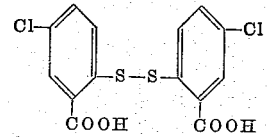

*Preparation of alkyl esters of thiosalicylic and substituted thiosalicylic acids*

Alkyl esters of thiosalicylic and substituted thiosalicylic acids can be readily prepared by conventional procedures of esterification with alkanols. A preferred method is that typified by the following preparation of methyl thiosalicylate:

Into a solution of thiosalicylic acid in approximately 10 volumes of methanol, which is heated to and held at a temperature sufficient to maintain a gentle reflux, a stream of dry hydrogen chloride gas is passed slowly for a period between approximately 8 and approximately 10 hours. The excess methanol is then evaporated and the ester is recovered by vacuum distillation. The ester is thus obtained in a yield of approximately 80 to 85% of the theoretical. Its boiling point is 115–119° C. at a pressure of 1 to 2 millimeters. Small proportions of methyl dithiosalicylate, which has a melting point of 130–132° C., may be recovered from the residue.

In this manner the methyl esters of each of the foregoing thiosalicylic acids were prepared. The melting points of those which were characterized, were as follows:

| Methyl Ester of Thiosalicylic Acid | M. P., ° C. |
|---|---|
| 1. 5-Chloro- | 44–45 |
| 2. 3,5-Dibromo- | 88–89 |

Thiosalicylhydrazide and its ring-substituted derivatives can be prepared by the reaction of an alkyl ester of thiosalicylic acid or substituted thiosalicylic acid with hydrazine hydrate in accordance with the conventional method for the preparation of benzhydrazide. The resulting thiols (thiosalicylhydrazides) oxidize slowly in the air to disulfides (dithiosalicylhydrazides) but they may be converted completely to disulfides by reaction with iodine and other mild oxidizing agents, as referred to hereinbefore.

In place of thiosalicylic acid esters, alkyl esters of halogen-substituted thiosalicylic acids may be used to produce corresponding halogen-substituted thiosalicylhydrazides. Thiosalicylhydrazides and dithiosalicylhydrazides may be condensed with aldehydes to obtain compounds characterized by a high order of activity against the fungi *Trichophyton mentagrophytes*, *Nocardia asteroides*, and *Microsporum gypseum*.

The following is a typical method of preparing thiosalicylhydrazide:

EXAMPLE 1. THIOSALICYLHYDRAZIDE

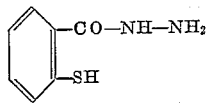

Thiosalicylhydrazide is readily prepared from an alkyl ester of thiosalicylic acid in accordance with the general method used heretofore for the preparation of the hydrazide of benzoic acid.

Into a 300-milliliter round-bottomed flask provided with a Glascol heater and reflux condenser are placed 30 grams (0.177 mole) of methyl thiosalicylate, 75 grams (1.27 moles) of 85% hydrazine hydrate and 15 milliliters of isopropyl alcohol. The mixture is heated to reflux and held at that temperature for approximately 3½ hours. After cooling in an ice bath, the yellow solution is diluted with 200 milliliters of water and acidified with 6N sulfuric acid to a pH between 6.5 and 7.0. The light-lemon-yellow-colored solid which separates is collected on a Buechner funnel and washed with 100 milliliters of cold water. Approximately 22 grams of thiosalicylhydrazide having a melting point of 112–116° C. and corresponding to a yield of 74% of the theoretical, is obtained. The melting point of the product is raised to 115–116° C. by two recrystallizations from 10 parts of water.

*Preparation of dithiosalicylhydrazides*

Hydrazides of dithiosalicylic acids may be prepared by reaction of a lower-alkyl ester of the dithiosalicylic acid with at least three molecular proportions of hydrazine hydrate followed by a subsequent oxidative procedure. In such reaction, the lower-alkyl ester of dithiosalicylic acid is converted to the hydrazide of the thiosalicylic acid, which is then oxidized to the disulfide, namely, the dithiosalicylhydrazide. These reactions may be represented as follows:

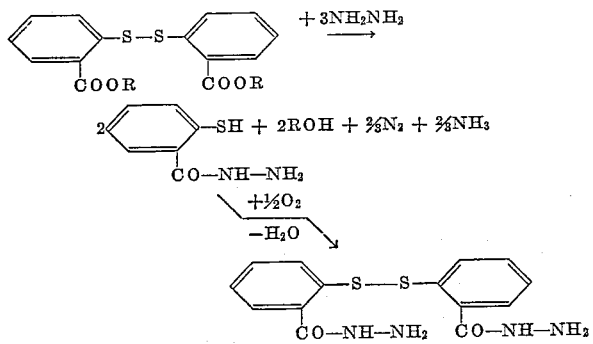

A convenient method of preparing dithiosalicylhydrazides consists in the oxidation of thiosalicylhydrazides, which may be effected with iodine, as typified by the following preparation of dithiosalicylhydrazide:

EXAMPLE 2. DITHIOSALICYLHYDRAZIDE

Thirteen and four-tenths grams (0.08 mole) of thiosalicylhydrazide is dissolved in 100 milliliters of 50% aqueous methanol by warming. The solution is cooled to approximately room temperature and, while agitating it vigorously, 10.1 grams (0.04 mole) of iodine is added in one portion. The iodine reacts as rapidly as it dissolves and a clear light-yellow solution is obtained. The solution is diluted with an equal volume of water and sodium bicarbonate solution is added for neutralization, whereupon a white precipitate forms. This precipitate is collected by filtration, washed with water, and dried at 50° C. The yield is approximately 10.5 grams of dithiosalicylhydrazide, which corresponds to 79% of the theoretical. The product has a melting point of 206–208° C., which, upon recrystallization from a mixture of dimethylformamide and methanol, is raised to 214–215° C. The melting point of its dihydrochloride is 220–222° C.

*Preparation of alkoxybenzaldehydes*

Various alkoxybenzaldehydes are known, and methods for their preparation have been described. I prefer to prepare these compounds by the reaction of a hydroxybenzaldehyde (salicylaldehyde or 4-hydroxybenzaldehyde) with an excess of an alkyl halide (or, in the preparation of 2-formylphenoxyacetic acid, with chloroacetic acid) in the presence of an alkali-metal hydroxide. In this manner the following alkoxybenzaldehydes have been prepared:

| Benzaldehyde | B. P., °C. |
|---|---|
| 2-Methoxy- | 199/250 mm. |
| 2-Ethoxy- | 143–5/25 mm. |
| 2-n-Propoxy- | 87/0.3 mm. |
| 2-n-Butoxy- | 105/0.2 mm. |
| 2-Isobutoxy- | 117/1–2 mm. |
| 2-sec.-Butoxy- | 78/0.05 mm. |
| 2-n-Amyloxy- | 112/0.4 mm. |
| 2-Isoamyloxy- | 94/0.1 mm. |
| 2-Carboxymethoxy- | (M. P. 129° C.). |
| 2-(2-Chloroethoxy)- | 103/0.15 mm. |
| 2-(2-Diethylaminoethoxy)- | 118/0.08 mm. |
| 4-(2-Chloroethoxy)- | 110/0.1 mm. |
| 4-(2-Diethylaminoethoxy) | 106/0.1 mm. |

EXAMPLE 3. SALICYLIDENETHIOSALICYLHYDRAZIDE

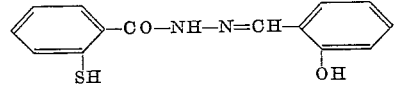

Into a 400-milliliter beaker are placed 100 milliliters of methanol, 2 milliliters of glacial acetic acid and 10 grams (0.0595 mole) of thiosalicylhydrazide. The mixture is heated to boiling. To the then clear solution is added 7.59 grams (0.0615 mole) of salicylaldehyde and the boiling is continued for an additional 5 minutes. Upon cooling to 10° C., glistening crystals begin to separate. The crystals are then collected on a Buechner funnel, washed with 20% aqueous methanol (20 water to 80 methanol) and dried at 60° C. A yield of approximately 14.9 grams (95% of theory) of salicylidenethiosalicylhydrazide, having a melting point of 172–176°, is thus obtained.

EXAMPLE 4. ETHYLSULFONYLBENZALTHIOSALICYLHYDRAZIDE

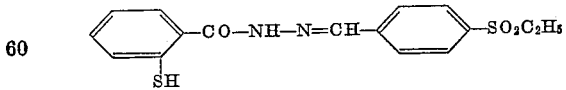

By proceeding as described in Example 3, but substituting an equimolecular proportion of 4-ethylsulfonylbenzaldehyde (Bernstein et al., J. Amer. Chem. Soc., 1951, vol. 73, page 909) for salicylaldehyde and using 25% aqueous acetic acid as the solvent, 4-ethylsulfonylbenzalthiosalicylhydrazide is obtained in approximately 90% of the theoretical yield. Its melting point is 168–170° C.

EXAMPLE 5. 2,4-DICHLOROBENZALTHIOSALICYLHYDRAZIDE

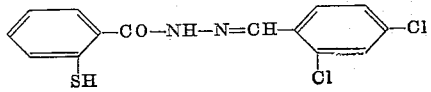

By substituting an equimolecular proportion of 2,4-dichlorobenzaldehyde for the salicylaldehyde of Example 3, and isopropyl alcohol for methanol, 2,4-dichlorobenzalthiosalicylhydrazide is obtained in a yield of approximately 95% of the theoretical. The melting point of the product is 211–216° C.

EXAMPLE 6. BIS-(4-QUINOLYLMETHYLENE)DITHIOSALICYLHYDRAZIDE

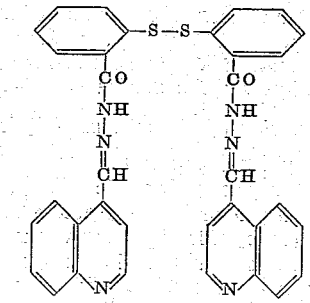

This compound was prepared by reaction of dithiosalicylhydrazide dihydrochloride (Example 2) with a stoichiometrical quantity of 4-formylquinoline (4-quinoline carboxaldehyde) in methanol, substantially as described hereinabove for the preparation of related benzal thiosalicylhydrazides. It has a melting point of 224–225° C. after recrystallization from aqueous dimethylformamide. The melting point of its dihydrochloride is 212–215° C. with decomposition.

EXAMPLE 7. BIS-(2-QUINOLYLMETHYLENE)DITHIOSALICYLHYDRAZIDE

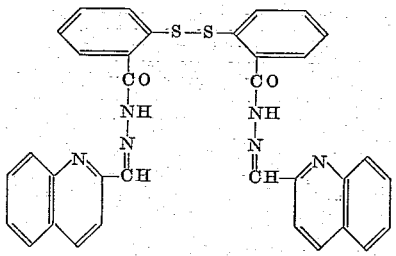

This compound may be prepared in exactly the same manner as the corresponding 4-quinolyl derivative by substituting 2-formylquinoline for 4-formylquinoline. Its melting point, after recrystallization from aqueous methylcellosolve, is 167–170° C. Its dihydrochloride has a melting point of 228–230° C.

EXAMPLE 8. BIS-(2,4-DICHLOROBENZAL)DITHIOSALICYLHYDRAZIDE

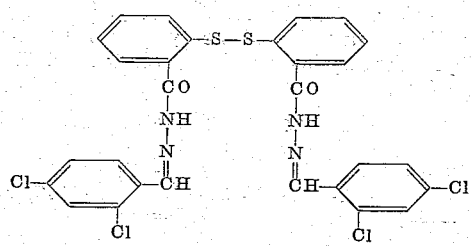

This compound can be prepared as follows:
Five hundred milligrams of 2,4-dichlorobenzaldehyde was added to a hot solution of 334 milligrams of dithiosalicylhydrazide in 5 milliliters of glacial acetic acid. After a few minutes, crystals started to separate from the hot solution. The mixture was cooled and the crystals were collected and washed successively with acetic acid and methanol. The melting point of the crystals was 253–255° C. and 505 milligrams of them, equivalent to a yield of 78% of the theoretical, was obtained. After two recrystallizations form a mixture of dimethylformamide and water, the melting point was raised to 266–267° C.

The identical compound, having the same characteristics, can also be made by condensation of thiosalicylhydrazide and 2,4-dichlorobenzaldehyde as described in Example 5 and subsequent oxidation of the condensation product in pyridine with an equivalent amount of iodine.

EXAMPLE 9. BIS-(3,4-DICHLOROBENZAL)DITHIOSALICYLHYDRAZIDE

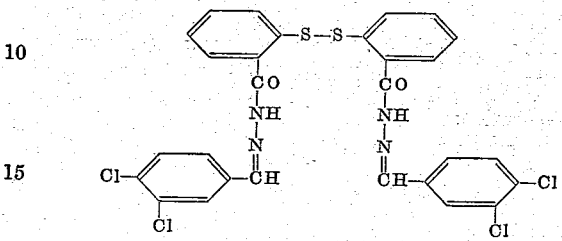

This compound can be made by the oxidation of 3,4-dichlorobenzalthiosalicylhydrazide (M. P. 155–160° C.) with an equivalent quantity of iodine. Its melting point is 220–222° C. after recrystallization from n-butanol.

EXAMPLE 10. 5,5'-DIBROMODITHIOSALICYLHYDRAZIDE

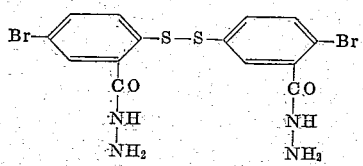

This compound was prepared in 80% yield by oxidation (with the stoichimetrically equivalent amount of iodine in aqueous pyridine) of 5-bromothiosalicylhydrazide, which was prepared from hydrazine hydrate and methyl 5-bromothiosalicylate. After recrystallizing twice from methanolic dimethylformamide, its melting point was 249–250° C.

EXAMPLE 11. BIS-(2,4-DICHLOROBENZAL)-5,5'-DICHLORODITHIOSALICYLHYDRAZIDE

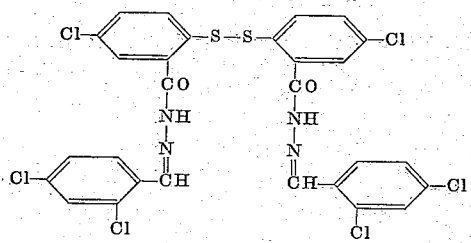

Condensation of 5-chlorothiosalicylhydrazide with 2,4-dichlorobenzaldehyde in isopropanol produced a yield of 90% of the theoretical quantity of 2,4-dichlorobenzal-5-chlorothiosalicylhydrazide. On recrystallization from methylcellosolve, this was converted to the desired disulfide which had a melting point of 245–247° C. and was identical with the product obtained by condensation of 5,5'-dichlorodithiosalicylhydrazide (melting point, 249–250° C.) with 2,4-dichlorobenzaldehyde.

EXAMPLE 12. BIS-(2-METHOXYBENZAL)-5,5'-DICHLORODITHIOSALICYLHYDRAZIDE

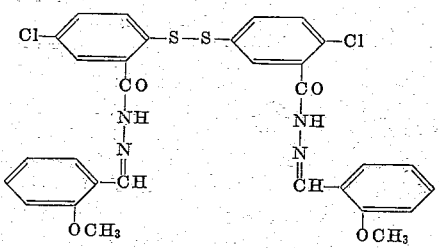

This compound was made by condensation of 2-methoxybenzaldehyde and 5,5'-dichlorodithiosalicylhydrazide (melting point 249–250° C.), which was prepared from hydrazine hydrate and methyl 5-chlorothiosalicylate (melting point 44–45° C.). Its melting point was 245–247° C.

EXAMPLE 13. 3,3',5,5'-TETRACHLORODITHIOSALICYLHYDRAZIDE

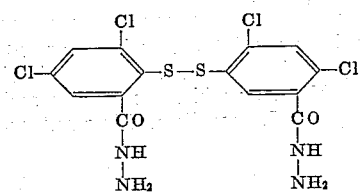

This compound was prepared by the reaction of hydrazine hydrate with methyl 3,5-dichlorothiosalicylate (prepared from 3,5-dichlorothiosalicylic acid having a melting point of 196–198° C.) and oxidation of the resulting 3,5-dichlorothiosalicylhydrazide with iodine. Its melting point was 233–234° C.

EXAMPLE 14. BIS-[N-(2,4-DICHLOROBENZYL)] DITHIOSALICYLHYDRAZIDE

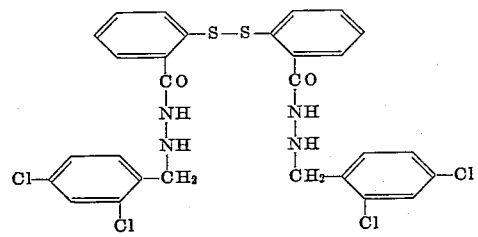

This compound was made by the electrolytic reduction of 2,4-dichlorobenzalthiosalicylhydrazide (Example 5, melting point 211–216° C.) in 50% aqueous piperidine using a mercury cathode and a carbon anode. The product, recrystallized from aqueous dimethylformamide, had a melting point of 255–257° C.

EXAMPLE 15. BIS-(4-β-CHLOROETHOXYBENZAL)DITHIOSALICYLHYDRAZIDE

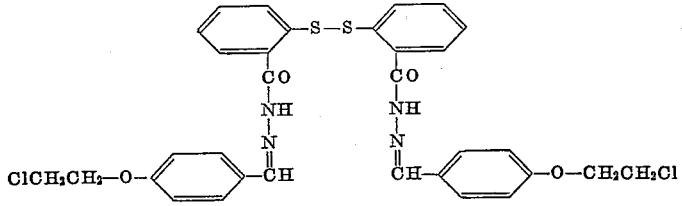

This compound was prepared from 4-(β-chloroethoxy)-benzaldehyde (boiling point 110° C. at 0.1 mm.) and dithiosalicylhydrazide. Its melting point was 237–238° C. after recrystallization from methanolic dimethylformamide.

EXAMPLE 16. BIS-(2-N-PROPOXYBENZAL)DITHIOSALICYLHYDRAZIDE

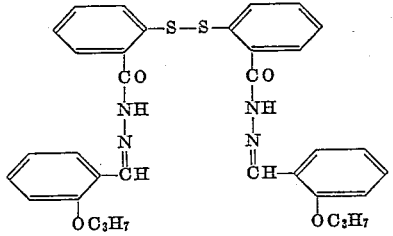

This compound was prepared from 2-n-propoxybenzaldehyde (boiling point 87° C. at 3 mm.) and dithiosalicylhydrazide. Its melting point was 224–225° C. after recrystallization from aqueous ethanol.

The compounds described in the examples of this invention were tested against various species of bacteria and fungi, to determine their activity. In these tests a glycerol solution or suspension containing 2500 gammas (2.5 milligrams) of the compound per milliliter was used. Aliquot portions of this solution were then dispensed into preselected volumes of fluid nutrient medium (Brainheart, Sabouraud or a yeast-extract medium) in test tubes, so as to prepare media having concentrations of the compound of respectively 250, 125, 50 and 25 gammas per milliliter of nutrient medium. These media were then inoculated with a loop (0.01 milliliter) of a viable culture of the specified organism and incubated at a temperature of 37° C. for 24 hours. In the case of the fungi (*Trichophyton mentagrophytes* and the others), the incubation was at prevailing room temperatures for a period of at least 4 days.

The values reported in the tables are approximately the minimal concentrations or ranges of concentrations in gammas per milliliter that completely inhibit the growth of the organism. A value "over" a specified value is without special significance since the compound may be inactive at even higher values. The organisms used are those listed at the head of the respective tables, and the values for the three Microsporum species represent the range obtained in separate tests with each of three species, namely, *gypseum*, *auodouini* and *canis*, while those of the three Trichophyton species similarly represent the range obtained in separate tests with the species *rubrum*, *schoenleini* and *mentagrophytes*.

A mixture of undecylenic acid and its zinc salt, which are the active constituents of several commercially available products for treatment of fungous infections of the skin, was used as a control. The inhibiting concentrations of this composition for various fungi are represented in the table of fungi opposite the heading "Commercial Composition A." The activities of another compound commercially available for the treatment of "athlete's foot" (epidermophytosis interdigium), namely, 2 - dimethylamino - 6 - β - diethylaminoethoxybenzothiazole, against the test bacteria and fungi, are listed opposite the heading "Commercial Composition B" in both tables.

The compounds of the present invention whose activities are specified in the tables are as follows:

| Example | Compound |
|---|---|
| 1 | Thiosalicylhydrazide. |
| 2 | Dithiosalicylhydrazide. |
| 5 | 2,4-Dichlorobenzalthiosalicylhydrazide. |
| 6 | Bis-(4-quinalylmethylene)dithiosalicylhydrazide dihydrochloride. |
| 7 | Bis-(2-quinolylmethylene)dithiosalicylhydrazide dihydrochloride. |
| 8 | Bis-(2,4-dichlorobenzal)dithiosalicylhydrazide. |
| 9 | Bis-(3,4-dichlorobenzal)dithiosalicylhydrazide. |
| 10 | 5,5'-Dibromodithiosalicylhydrazide. |
| 11 | Bis-(2,4-dichlorobenzal)-5,5'-dichlorodithiosalicylhydrazide. |
| 12 | Bis-(2-methoxybenzal)-5,5'-dichlorodithiosalicylhydrazide. |
| 13 | 3,3',5,5'-Tetrachlorodithiosalicylhydrazide. |
| 14 | Bis-[N-(2,4-dichlorobenzyl)]dithiosalicylhydrazide. |
| 15 | Bis-(4-chloroethoxybenzal)dithiosalicylhydrazide. |
| 16 | Bis-(2-n-propoxybenzal)dithiosalicylhydrazide. |

BACTERIA

| Compound | Activities in gammas per milliliter | | | |
|---|---|---|---|---|
| | Staphylococcus aureus | Proteus vulgaris | Pseudomonas aeruginosa | Brucella abortus |
| Commercial Compound B | over 1,000 | over 1,000 | over 1,000 | over 1,000 |
| Example 1 | | | | 50-125 |
| Example 2 | 50-125 | 50-125 | 125-250 | |
| Example 5 | 50-125 | 125-250 | over 250 | 50-125 |
| Example 6 | 6.25-12.5 | 12.5-25 | 125 | 1.25-2.5 |
| Example 7 | 50 | 125 | 125 | 1.25-2.5 |
| Example 8 | 25.50 | 25.50 | 125.250 | 25-50 |
| Example 10 | over 250 | over 250 | over 250 | 5-12.5 |
| Example 11 | 125 | 125 | over 250 | 5-12.5 |
| Example 12 | 50 | 50 | over 250 | 5-12.5 |
| Example 13 | 125 | 250 | over 250 | 5-12.5 |
| Example 14 | 125 | 250 | 250 | 125 |
| Example 15 | 50 | 125 | over 250 | 12.5-25 |
| Example 16 | 125 | 125 | over 250 | 12.5-25 |

FUNGI

| Compound | Activities in gammas per milliliter | | | | | |
|---|---|---|---|---|---|---|
| | Microsporum (3 species) | Trichophyton (3 species) | Nocardia asteroides | Histoplasma capsulatum | Aspergillus fumigatus | Candida albicans |
| Commercial Compound A | 50-125 | 50-250 | 250 | 250 | over 250 | |
| Commercial Compound B | 12.5-100 | 12.5-100 | over 1,000 | 100-200 | over 1,000 | over 1,000 |
| Example 6 | 2.5-25 | 2.5-12.5 | 12.5-25 | 5-12.5 | 250 | 25-50 |
| Example 7 | 12.5-50 | 6.25-50 | 12.5-25 | 6.25-12.5 | 50 | 250 |
| Example 8 | 50 | 12.5-25 | 250 | 5-12.5 | 250 | 50-125 |
| Example 9 | 12.5-25 | 5-25 | 125 | 5-12.5 | 250 | 125 |
| Example 10 | 5-50 | 5-25 | 5-12.5 | 5-12.5 | 125-250 | over 250 |
| Example 11 | 12.5-25 | 5-12.5 | 12.5-25 | 12.5-25 | 50-125 | 250 |
| Example 12 | 12.5-250 | 2.5-12.5 | 12.5-2.5 | 12.5-25 | 50-125 | 250 |
| Example 13 | 5-50 | 5-25 | 50-125 | 5-12.5 | 50-125 | 250 |
| Example 14 | 12.5-125 | 12.5-25 | 1.25-2.5 | 5-12.5 | 125 | over 250 |
| Example 15 | 12.5-50 | 6.25-25 | 6.25-12.5 | 6.25-12.5 | over 250 | over 250 |
| Example 16 | 50 | 12.5-50 | 50 | 6.25-12.5 | 50 | 250 |

The compounds of the present invention may be dispensed in various conventional forms for use as bactericides and fungicides. Salts of thiosalicylhydrazide, dithiosalicylhydrazide and the bis-(quinolylmethylene)dithiosalicylhydrazides of Examples 6 and 7, such as the respective dihydrochlorides, sulfates, and salts with similar strong acids, are used in preference to the free thiol or disulfide. For use in the treatment of epidermophytosis interdigium, the compounds or their salts may be applied to the affected part in the form of ointments in conventional ointment bases or as aqueous suspensions. A suitable ointment is one composed of 90% petrolatum and 5% by weight of one or a mixture of two or more of the active compounds of this invention. The proportion of the active compounds may be varied, for example, between the range of 1 to 10% by weight, dependent upon its activity. Other ointment bases, such as polyethylene glycol compounds, may be substituted for petrolatum. An example of such ointments is the following:

EXAMPLE 17. BACTERICIDAL AND FUNGICIDAL OINTMENT

An ointment base is prepared from the following substances in the specified proportions by weight:

Parts by weight
Polyethylene glycol wax (average molecular weight between 3000 and 3700; solidifying range 50 to 55° C.) _____ 34.0
Polyethylene glycol liquid (average molecular weight between 300 and 400) _____ 42.5
Sorbitan monopalmitate (dispersing agent) _____ 0.85
Water _____ 7.65

The polyethylene glycol wax and liquid together with the sorbitan monopalmitate are stirred together and heated to a temperature of approximately 70° C. The water is then added and the stirring is continued until the base congeals. To 85 parts by weight of the foregoing ointment base are then added with stirring the following solids as finely ground powders:

Parts by weight
Bis - (4 - quinolylmethylene)dithiosalicylhydrazide dihydrochloride (Compound of Example 6) ____ 5.0
Ethyl p-aminobenzoate _____ 5.0
β-Phenylethyl alcohol _____ 0.05

These ingredients are intimately incorporated by grinding, either by stirring while the base is maintained at approximately 70° C. or while the base is maintained at approximately 70° C. or while cold in a roller or ointment mill.

Ointments containing one or a mixture of two or more of the fungicidal compounds of the invention may be prepared in a similar manner. The β-phenylethyl alcohol may be partially or completely replaced by geraniol or other suitable perfuming ingredient, or may be omitted. Other surface anesthetics such as 2-dimethylaminoethyl p-butylaminobenzoate hydrochloride may be used to replace the ethyl p-aminobenzoate. The sorbitan monopalmitate dispersing agent may be replaced by sodium lauryl sulfate.

EXAMPLE 18. BACTERICIDAL AND FUNGICIDAL AQUEOUS SUSPENSION

An aqueous suspension of one of the compounds of this invention that is thixotropic, that is, that solidifies on standing but becomes fluid when shaken, and that dries to a smooth thin film when applied to the skin similar to a hand lotion, may be prepared from the following ingredients:

Bis - (2,4 - dichlorobenzal)dithiosalicylhydrazide (Compound of Example 8) __parts by weight__ 5
Complex colloidal magnesium aluminum silicate _____parts by weight__ 1.5
Polyethylene glycol wax (average molecular weight 1500) _____parts by weight__ 20
Water _____q. s.__ 100

The complex colloidal magnesium aluminum silicate (which may be the commercial product sold by R. T. Vanderbilt Co. under the tradename Veegum HV), is suspended in water. A suspension of the powdered active compound is made with the aid of a small amount of water. These two suspensions are then combined and homogenized by passing the mixture through a hand homogenizer or a colloid mill.

The foregoing aqueous suspension was tested to determine whether it produced any irritation to the skin or any allergic reactions. In patch tests on humans, not one instance of any such reactions was observed.

Similar aqueous suspensions may be made with the other compounds of this invention by suitable modification of the proportions, if suspensions that are thixotropic are desired.

The compounds may also be utilized in the form of vaginal suppositories prepared from conventional ingredients in conventional manners. A suitable composition for the preparation of such suppositories consists of 90 parts by weight of cocoa butter, 5 parts of spermaceti wax and 5 parts by weight of one or a mixture of two or more of the active compounds. The proportions, as is obvious, may be varied rather widely to obtain products having the desired activity. The preparation of a vaginal suppository is described in the example which follows:

EXAMPLE 19. VAGINAL SUPPOSITORY

A suppository base is prepared by mixing together at approximately 50° C., the following ingredients:

| | Parts by weight |
|---|---|
| Spermaceti | 5.0 |
| Cocoa butter | 95.0 |

To this base (100 parts by weight) is then added 5 parts by weight of bis-(3,4-dichlorobenzal) dithiosalicylhydrazide (Compound of Example 9) and the same is ground together until a homogeneous uniform dispersion is obtained. The dispersion is then moulded, preferably by a cold extrusion process, into suppositories of conventional size and shape.

Instead of the base described above, an emulsifying grade of propylene glycol monostearate may be used. Perfuming ingredients such as geraniol or β-phenylethyl alcohol, with or without chlorophyllin, may also be added if desired.

Other useful preparations containing the compounds of the invention are dusting powders, which may be prepared, for example, by mixing together 70 parts of talcum powder, 25 parts of colloidal kaolin and 5 or more parts of one or more of the active compounds. Such powders may be used in place of ointments for the treatment of epidermophytosis interdigium and may also be applied to shoes and other footwear that are carriers of the infecting organisms.

Inasmuch as the foregoing specification comprises preferred embodiments of the invention, it is to be understood that the invention is not restricted thereto and that modifications and adaptations thereof may be made in conventional manner. The invention is accordingly restricted only by the scope of the appended claims.

I claim:

1. A compound of the group represented by the formula

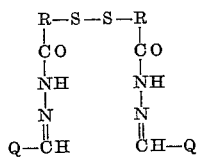

in which each R is a radical of the group consisting of 2-phenylene and 4-chloro-2-phenylene radicals, and each Q is a radical of the group consisting of 2,4-dichlorophenyl, 3,4-dichlorophenyl, 2-(lower alkoxy) phenyl, 4-(β-chloroethoxy) phenyl and 2 and 4-quinolyl radicals.

2. Bis-(4-quinolylmethylene) dithiosalicylhydrazide.
3. Bis-(2-quinolylmethylene) dithiosalicylhydrazide.
4. Bis-(2,4-dichlorobenzal) dithiosalicylhydrazide.
5. Bis-(3,4-dichlorobenzal) dithiosalicylhydrazide.
6. Bis-(2-methoxybenzal) - 5,5' - dichlorodithiosalicylhydrazide.

References Cited in the file of this patent

UNITED STATES PATENTS 2,603,617    Hook et al. _____ July 15, 1952

OTHER REFERENCES

Kaltz et al.; J. Org. Chem., vol. 18, No. 10, October 1953. (Received April 9, 1953).